UNITED STATES PATENT OFFICE.

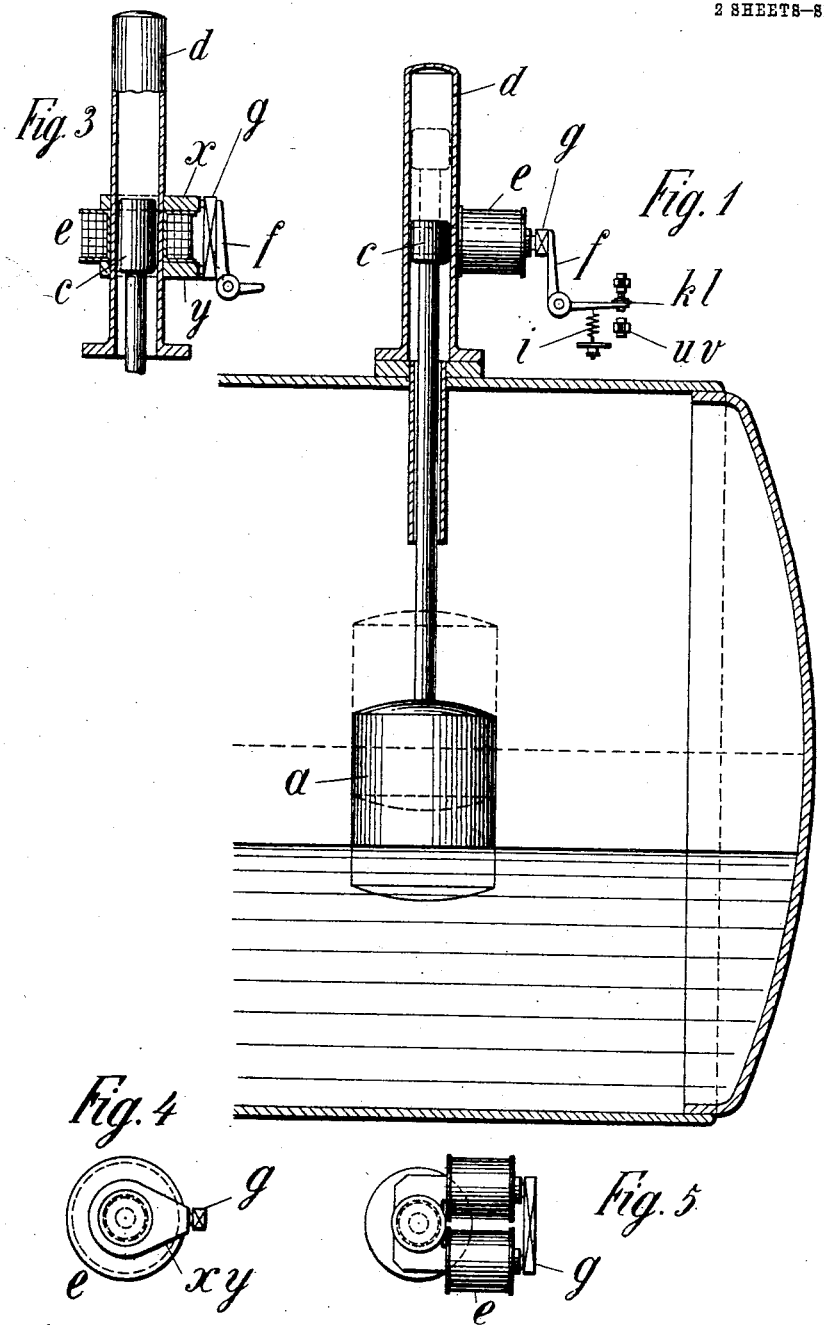

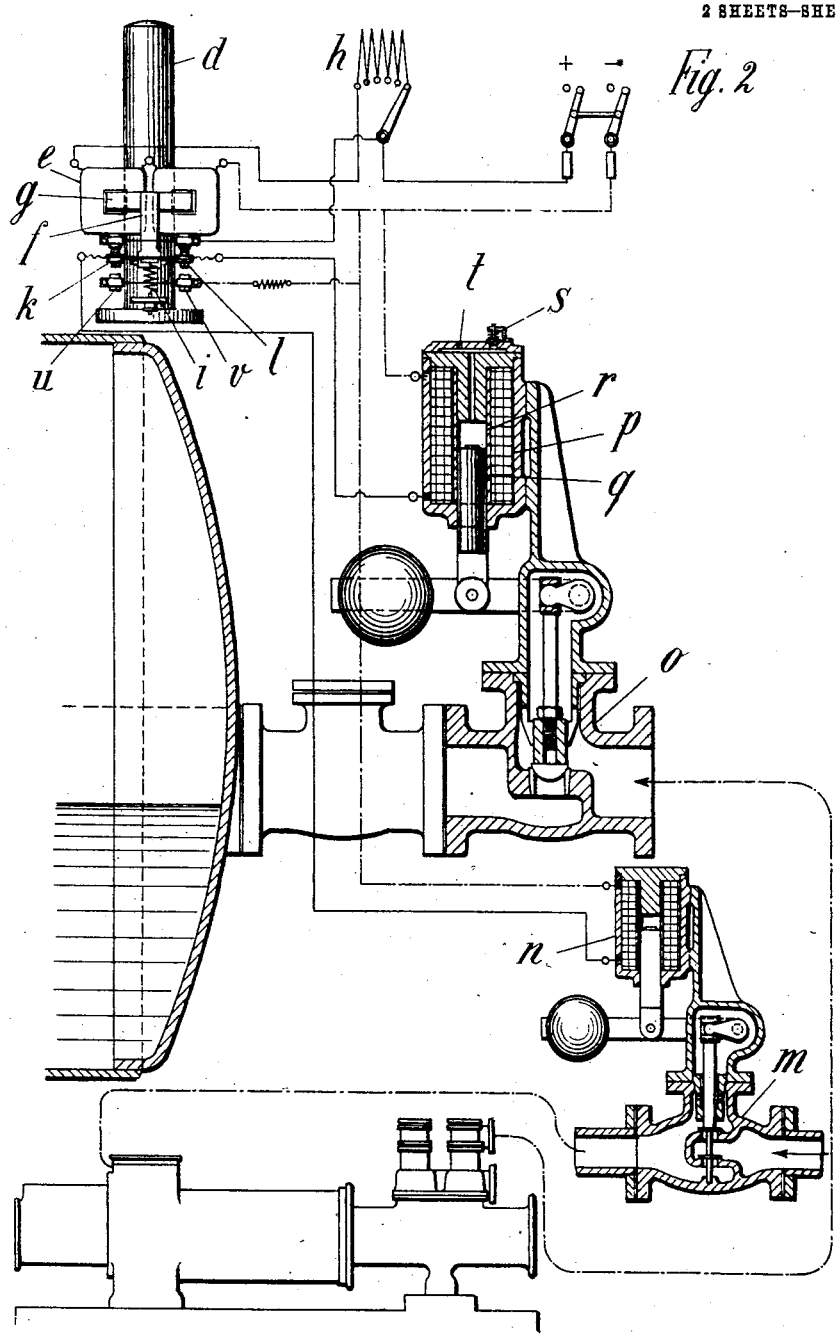

KARL REUBOLD, OF LINDEN, NEAR HANOVER, GERMANY.

BOILER-FEED REGULATOR.

970,951.   Specification of Letters Patent.   Patented Sept. 20, 1910.

Application filed September 8, 1909. Serial No. 516,734.

*To all whom it may concern:*

Be it known that I, KARL REUBOLD, subject of the Emperor of Germany, residing at 1 Gottingerstrasse, Linden, near Hanover, Germany, have invented certain new and useful Improvements in Boiler-Feed Regulators, of which the following is a specification.

This invention relates to apparatus for maintaining constant the water level in steam generators of the type wherein a float in the boiler closes an electric circuit when the level falls.

According to this invention the float carries an iron body adapted to move in a metal pipe or casing which only communicates with the steam space and which, when the water level is at its lowest, is embraced or surrounded by the two arms of a permanently energized electromagnet, the armature of which is thus attracted thereby effecting the opening of the feed water valve.

A construction of apparatus according to this invention is shown partly in vertical section in Figures 1 and 2 in connection with a steam generator. Figs. 3 and 4 show in vertical section and plan respectively a modified construction of electromagnet. Fig. 5 is a plan of the electromagnet seen in Fig. 1.

A float $a$ within the steam generator has an upwardly extending rod carrying a cylindrical wrought iron body $c$ which moves in a metal pipe $d$ which is closed in a steam-tight manner so that the float can readily follow the fluctuations in the water level without any danger of jamming. At the point where the iron body $c$ comes to rest when the float is at its lowest, the metal pipe $d$ is surrounded by an electromagnet $e$ having two arms which are capable of attracting an armature $g$ secured to a bell crank lever $f$. The electromagnet $e$ is continuously energized by a current regulated by a resistance $h$ (Fig. 2). The magnet is energized in such a manner that it does not attract the armature $g$ which is normally held out of contact by a tension spring $i$, as long as the magnetic circuit, broken by the metal pipe $d$, is not closed by the iron body $c$ within the pipe. A cross piece is mounted on the bell crank lever $f$ carrying two contacts $k$ and $l$.

When the water in the generators is at its normal level, the iron body $c$ is in the position shown by dotted lines in Fig. 1. When the water reaches its lowest level the iron body closes the magnetic circuit of the electromagnet $e$ and by thus strengthening the magnetic field the armature $g$ is attracted. The contacts $k$ and $l$ thus close the circuit of an electromagnet $n$ thereby opening the steam valve $m$ (Fig. 2) of the feed pump and simultaneously by energizing an electromagnet $p$ opening the feed water valve $o$. The incoming water rises in the boiler, but the float $a$ is, however, still held in its lowest position since the iron body $c$ is attracted by the electromagnet $e$, as however the buoyancy of the float increases as the water level rises, the attraction of the magnet is overcome whereupon the float, together with the iron body, rises to a level corresponding with that of the water, and the armature $g$ of the electromagnet $e$ is released. The contacts $k$ and $l$ for the electromagnets $n$ and $p$ are broken, and the corresponding valves $m$ and $o$ closed by balance weights or the like. By varying the strength of the permanent current flowing through the magnet by means of the resistance $h$, the point at which the iron body is released can be adjusted, and in that way the normal water level determined. The lowest water level is regulated by the position of the electromagnet $e$ on the metal pipe $d$.

To avoid sudden pressures or shocks in the water pipes caused by sudden closing of the feed water inlet, the armature $q$ of the electromagnet $p$ is formed into a piston and moves in an air-tight manner in a cylinder $r$. When the armature is attracted, the compressed air can quickly escape through a small relief valve $s$ while when the armature is released the air can only enter through the small opening $t$ thus effecting a gradual closing of the valve.

The contacts $u$ and $v$ prevent self-induction when the electromagnets $n$ and $p$ are switched out.

In the construction of the electromagnet shown in Figs. 3 and 4, the magnet coil $e$ is concentric with and surrounds the metal tube or pipe $d$. The closing of the magnetic circuit is effected by the two parts $x$ and $y$ which attract the armature $g$.

What I claim as my invention and desire to secure by Letters Patent is:—

1. In apparatus for controlling the water supply to a steam generator the combination of a float in the generator, a tube on the generator in communication only with the steam space therein, an electro-magnet constantly energized and having its iron circuit disposed around the tube, a magnetic body adapted to rise and fall in the tube, an operative connection between the magnetic body and the float, an armature adapted to move toward the electro-magnet when the magnetic body is in that portion of the tube which is surrounded by the iron circuit of the electro-magnet, an electric circuit controlled by said armature, a water supply to the generator, an inlet valve for such supply, an electro-magnet operating such inlet valve and controlled by the electric circuit, a feed pump, a starting valve for said pump and an electro-magnet operating said pump and controlled by the electric circuit substantially as set forth.

2. In apparatus for controlling the water supply to a steam generator, the combination of a float in the generator, a tube on the generator in communication only with the steam space therein, an electro-magnet constantly energized and having its iron circuit disposed around the tube, a guide extending downwardly from said tube, a stem on the float passing through said guide, a magnetic body mounted on the stem and adapted to rise and fall in the tube, an armature adapted to move toward the electro-magnet when the magnetic body is in that portion of the tube which is surrounded by the iron circuit of the electro-magnet, an electric circuit controlled by said armature and a water supply to the generator controlled by such circuit substantially as set forth.

In testimony whereof I have signed my name to this specification in the presence of two subscribing witnesses.

KARL REUBOLD.

Witnesses:
PAUL THOMPSON,
M. BEHNE HANOVER.